(12) United States Patent
Korpics et al.

(10) Patent No.: US 11,434,841 B2
(45) Date of Patent: Sep. 6, 2022

(54) METHODS AND SYSTEMS FOR $NO_x$ OFFSET DIAGNOSTIC

(71) Applicant: Ford Global Technologies, LLC, Dearborn, MI (US)

(72) Inventors: Frank M Korpics, Belleville, MI (US); Brett Gayney, Southgate, MI (US); Dean Pennala, Howell, MI (US); William Goodwin, Farmington Hills, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/131,557

(22) Filed: Dec. 22, 2020

(65) Prior Publication Data
US 2022/0195956 A1 Jun. 23, 2022

(51) Int. Cl.
| | | |
|---|---|---|
| F02D 41/14 | (2006.01) |
| F01N 11/00 | (2006.01) |
| F01N 3/20 | (2006.01) |
| B60K 6/24 | (2007.10) |
| B60K 6/26 | (2007.10) |
| B60K 6/28 | (2007.10) |
| F01N 13/00 | (2010.01) |

(52) U.S. Cl.
CPC ............ *F02D 41/1494* (2013.01); *B60K 6/24* (2013.01); *B60K 6/26* (2013.01); *B60K 6/28* (2013.01); *F01N 3/2066* (2013.01); *F01N 11/00* (2013.01); *F01N 13/008* (2013.01); *F02D 41/146* (2013.01); *F02D 41/1441* (2013.01); *F01N 2550/02* (2013.01); *F01N 2550/22* (2013.01); *F01N 2610/02* (2013.01); *F01N 2900/1402* (2013.01)

(58) Field of Classification Search
CPC combination set(s) only.
See application file for complete search history.

(56) References Cited

U.S. PATENT DOCUMENTS

| | | | |
|---|---|---|---|
| 6,311,480 B1 | 11/2001 | Suzuki et al. | |
| 9,068,487 B2 * | 6/2015 | Minezawa | .......... F02D 41/1463 |
| 10,513,961 B2 | 12/2019 | Yoo et al. | |
| 10,619,546 B2 | 4/2020 | Inoue et al. | |
| 10,883,433 B2 * | 1/2021 | Glugla | ................ F02D 41/2454 |
| 2006/0117737 A1 * | 6/2006 | Ohsaki | ................ F02D 41/1494 60/276 |
| 2009/0139212 A1 * | 6/2009 | Miwa | ..................... F02D 41/222 60/277 |
| 2010/0101303 A1 * | 4/2010 | Sasaki | ................ G01N 27/4067 73/23.32 |
| 2014/0346041 A1 * | 11/2014 | Nishijima | ........... F02D 41/1494 204/408 |
| 2019/0145333 A1 * | 5/2019 | Surnilla | .............. F02D 41/1446 123/697 |
| 2019/0376425 A1 | 12/2019 | Kato et al. | |

* cited by examiner

*Primary Examiner* — Binh Q Tran
(74) *Attorney, Agent, or Firm* — Vincent Mastrogiacomo; McCoy Russell LLP

(57) ABSTRACT

Methods and systems are provided for a $NO_x$ sensor. In one example, a method includes heating a $NO_x$ sensor during a vehicle off in response to a cumulative heat energy applied to the $NO_x$.

19 Claims, 4 Drawing Sheets

METHODS AND SYSTEMS FOR $NO_x$ OFFSET DIAGNOSTIC

FIELD

The present description relates generally to adjusting $NO_x$ sensor conditions during an engine off condition to decrease sensed $NO_x$ offset.

BACKGROUND/SUMMARY

Selective catalytic reduction (SCR) catalysts may be utilized in the exhaust systems of engines (e.g., diesel engines or other lean-burn engines) to reduce nitrogen oxide ($NO_x$) emissions. A reductant, such as urea, may be injected into the exhaust system upstream of the SCR catalyst, and together, the reductant and the SCR catalyst may chemically reduce $NO_x$ molecules to nitrogen and water, thereby limiting $NO_x$ emissions. However, if a component of the $NO_x$ emission control system, such as the SCR catalyst, becomes degraded, $NO_x$ emissions may increase. $NO_x$ sensors, configured to measure $NO_x$ levels in the exhaust system, may therefore be positioned in the exhaust system to detect degradations of the $NO_x$ emission control system. Specifically, increases in $NO_x$ levels that may be indicative of degradation of one or more components of the $NO_x$ emission control system may be detected by the $NO_x$ sensors. Thus, the efficiency of the SCR catalyst and other components of a $NO_x$ emission control system may be monitored by one or more $NO_x$ sensors positioned in the exhaust system.

Current On-Board Diagnostics (OBD) regulations may require the monitoring of exhaust $NO_x$ sensors to determine whether the $NO_x$ sensors have degraded (e.g., developed gain skew), as well as to determine whether the $NO_x$ sensors have developed an offset that may influence exhaust emissions. These two types of determinations may be performed independently; gain skew degradation may be determined via a $NO_x$ sensor self-diagnostic (SD) test, whereas a separate test may be performed to determine whether the $NO_x$ sensor has developed an offset.

One approach for minimizing the offset developed in the $NO_x$ sensor is shown in U.S. Pat. No. 10,513,961 B2 by Yoo et al. Therein, a method includes heating the $NO_x$ sensor during certain conditions of an engine off event. Conditions for heating the $NO_x$ sensor during the engine-off include monitoring a dew point temperature and determining if an exhaust temperature is between an upper threshold and a lower threshold. If these conditions are met, then the sensor is heated and the SD and/or the offset is tested.

However, the inventors have identified some issues with the approaches described above. For example, conditions for heating the sensor are limited, which reduces a number of opportunities for the OBD to conduct the SD and the offset tests. As one example, the method disclosed determines if a dew point temperature is less than a maximum $NO_x$ sensor temperature and then monitors if an exhaust gas temperature is within a desired range for reliable testing. With hybrid capabilities increasing, exhaust gas temperatures may be low during an engine off event, despite other metrics for testing the SD or the offset.

In one example, the issues described above may be addressed by a method for heating at $NO_x$ sensor at a vehicle off in response to a cumulative heat energy applied to the $NO_x$ sensor over a drive cycle being less than a threshold. In this way, an enthalpy of the $NO_x$ sensor system is monitored to determine if heating is desired.

As one example, entry conditions for the self-diagnostic (SD) or the offset test may be determined based on a heat energy applied to the $NO_x$ sensor. If the heat energy is less than the threshold, then the $NO_x$ sensor did not have a sufficient amount of heat applied thereto to drive off ammonia ($NH_3$) accumulated thereon, which may impact the offset test. Alternatively, if the heat energy applied is greater than or equal to the threshold, then a heater may not be activated prior to the offset test or the SD test. In this way, heat applied over a drive cycle is measured, rather than an exhaust temperature at the vehicle off, to determine if heating the $NO_x$ sensor is desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
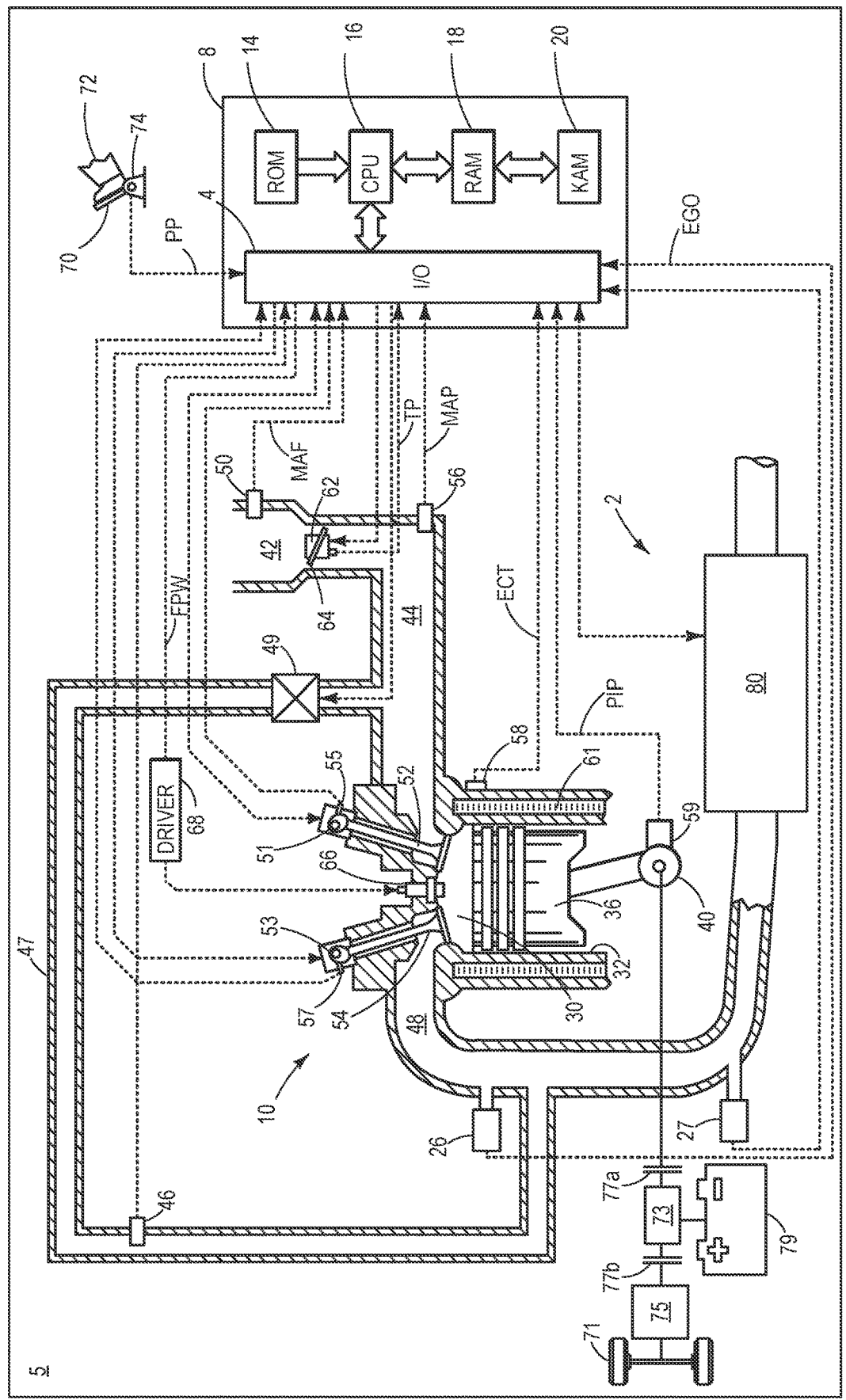
FIG. 1A shows a schematic diagram of an engine including an exhaust system with an exhaust gas treatment system.
Figure 2:
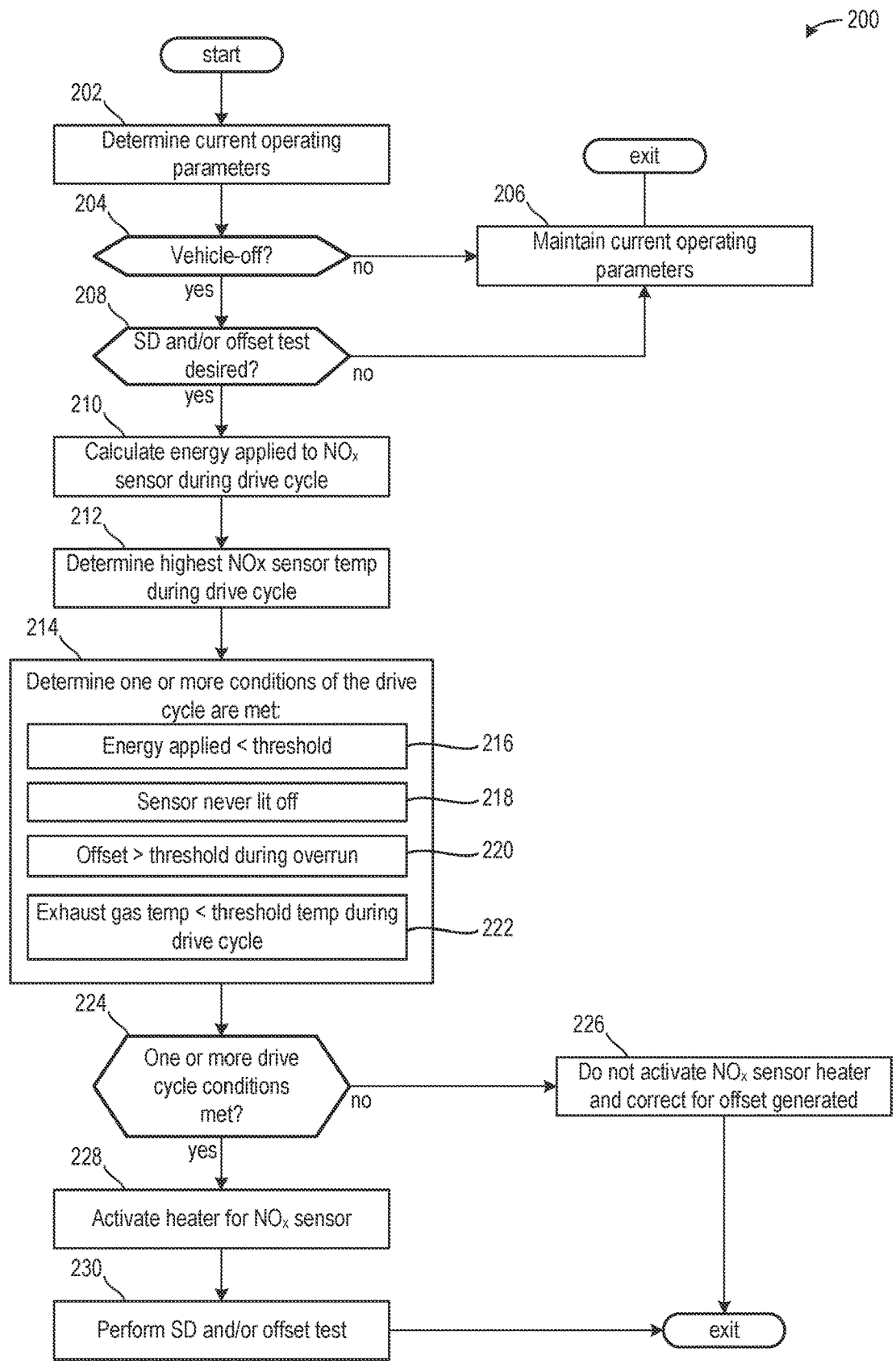
FIG. 2 shows a flow chart of an example method for determining if one or more conditions are met for heating a $NO_x$ sensor.
Figure 3:
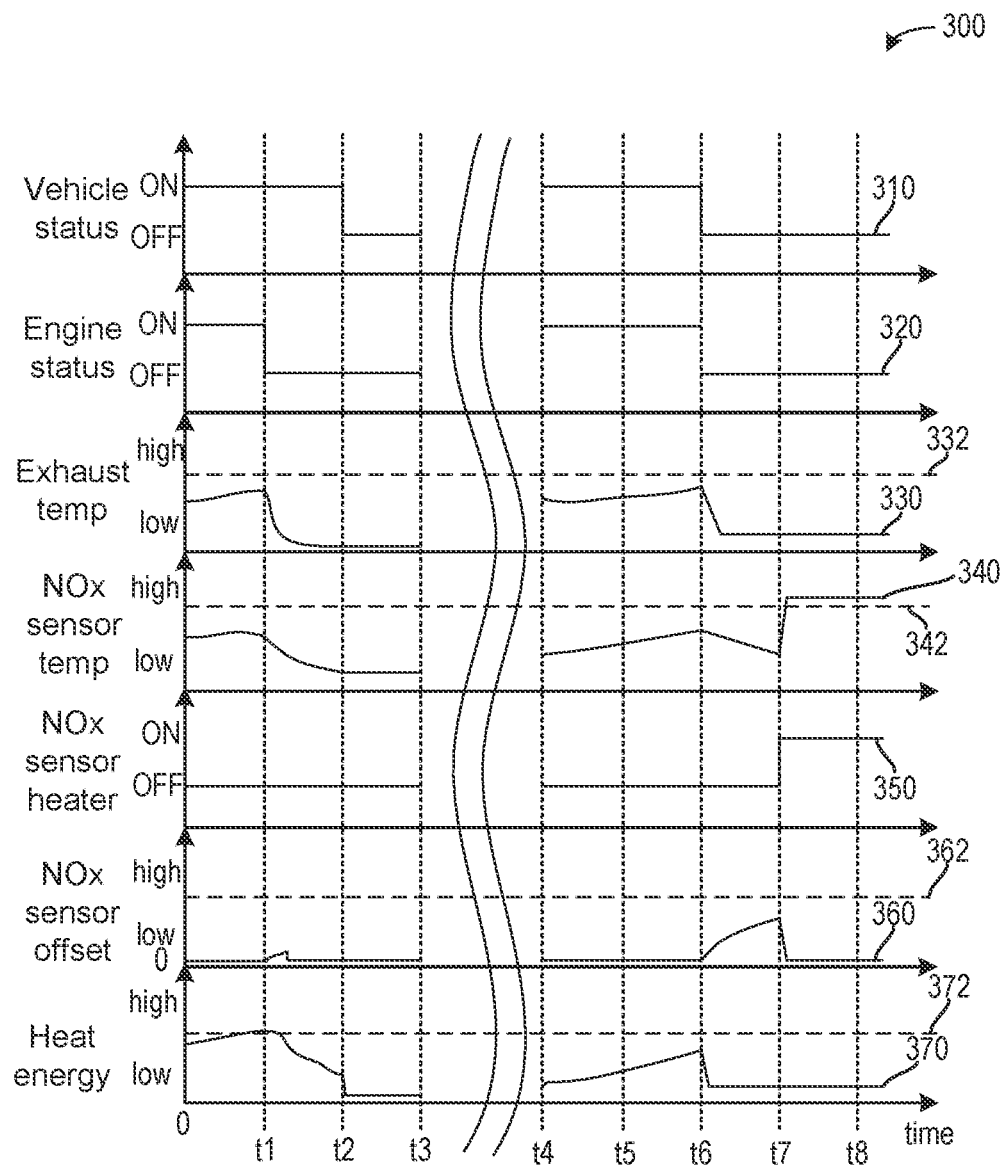
FIG. 3 shows an engine operating sequence for monitoring conditions prior to a vehicle off to determine if heating the $NO_x$ sensor is desired in accordance with the method of FIG. 2.

The following description relates to systems and methods for heating a $NO_x$ sensor. The $NO_x$ sensor is arranged in an exhaust system of a hybrid vehicle, as illustrated in FIG. 1A. The exhaust system is illustrated in greater detail with respect to FIG. 2. A flow chart illustrating a method for sensing if entry conditions for heating the $NO_x$ sensor are met is illustrated in FIG. 2. An engine operating sequence according to the method of FIG. 2 is illustrated in FIG. 3.

Figure 1B:
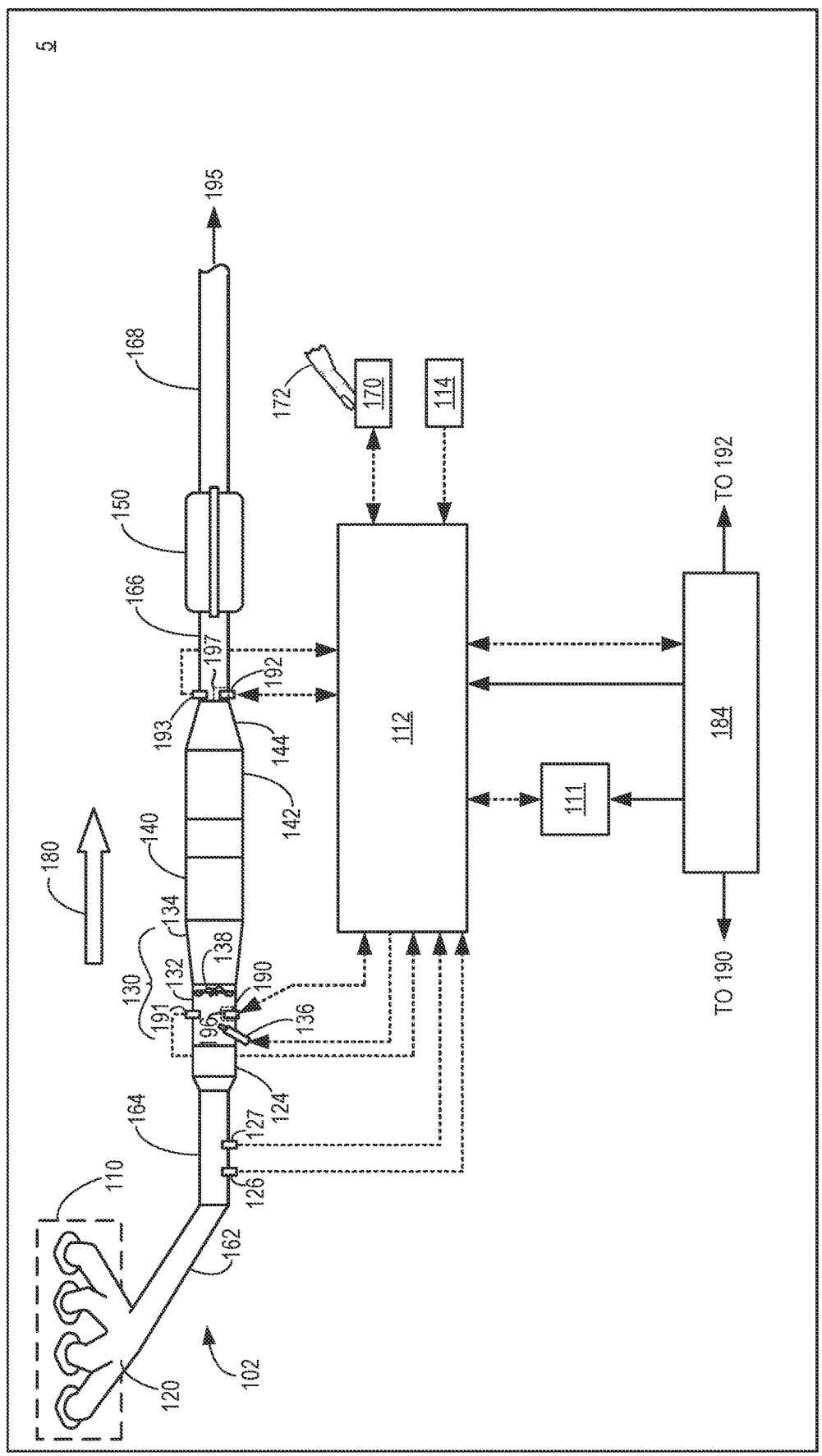
FIG. 1B shows a schematic diagram of an exhaust system for receiving engine exhaust gas.

FIGS. 1A-1B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Referring now to FIG. 1A, a schematic diagram showing one cylinder of a multi-cylinder engine 10, which may be included in a propulsion system of a vehicle (e.g., automobile) 5, is illustrated. Vehicle 5, including engine 10, may be controlled at least partially by a control system including a controller 8 and by input from a vehicle operator 72 via an input device 70. Controller 8 may be configured as a powertrain control module (PCM). In this example, the input device 70 includes an accelerator pedal and a pedal position sensor 74 for generating a proportional pedal position signal PP. A combustion chamber (e.g., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 receives intake air from an intake manifold 44 via an intake passage 42 and exhausts combustion gases via an exhaust passage 48. The intake manifold 44 and the exhaust passage 48 can selectively communicate with the combustion chamber 30 via intake valve 52 and exhaust valve 54. In some embodiments, the combustion chamber 30 may include two or more intake valves and/or two or more exhaust valves.

In the example depicted in FIG. 1A, the intake valve 52 and exhaust valve 54 are controlled by cam actuation via respective cam actuation systems 51 and 53. The cam actuation systems 51 and 53 each include one or more cams and may utilize one or more of cam profile switching (CPS), variable cam timing (VCT), variable valve timing (VVT), and/or variable valve lift (VVL) systems that may be operated by the controller 8 to vary valve operation. The positions of the intake valve 52 and the exhaust valve 54 are determined by position sensors 55 and 57, respectively. In alternative embodiments, the intake valve 52 and/or the exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 8 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

In the depicted example, the intake passage 42 includes a throttle 62 having a throttle plate 64. In this particular example, the position of the throttle plate 64 is varied by the controller 8 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 is provided to the controller 8 by throttle position signal TP. In the depicted example, the intake passage 42 further includes a mass air flow (MAF) sensor 50 and a manifold air pressure (MAP) sensor 56 for providing signals MAF and MAP, respectively, to the controller 8.

Further, in the depicted example, an exhaust gas recirculation (EGR) system is configured to route a desired portion of exhaust gas from the exhaust passage 48 to the intake passage 42 via an EGR passage 47. The amount of EGR provided to the intake manifold 44 may be varied by a controller 8 via an EGR valve 49. By introducing exhaust gas to the engine 10, the amount of available oxygen for combustion is decreased, thereby reducing combustion flame temperatures and reducing the formation of NOx for example. As depicted, the EGR system further includes an EGR sensor 46 arranged within the EGR passage 47, which provides an indication of one or more of pressure, temperature, and concentration of the exhaust gas within the EGR passage.

In the depicted example, engine 10 includes an exhaust system 2. Exhaust system 2 includes an exhaust gas sensor 26 coupled to the exhaust passage 48 upstream of an exhaust gas treatment system 80, and an exhaust gas temperature sensor 27 coupled to the exhaust gas passage 48 upstream of exhaust gas treatment system 80. An exemplary embodiment of exhaust gas treatment system 80 is shown in FIG. 1B and described below. The sensor 26 may be any suitable sensor for providing an indication of exhaust gas air/fuel ratio, such as a linear oxygen sensor or UEGO (universal or wide-range exhaust gas oxygen) sensor, a two-state oxygen sensor or EGO sensor, a HEGO (heated EGO) sensor, a NOx sensor, a hydrocarbon (HC) sensor, or a carbon monoxide (CO) sensor. Sensor 26 provides a signal EGO to the controller 8 in the example shown in FIG. 1A.

The controller 8 is shown in FIG. 1A as a microcomputer, including a microprocessor (e.g., CPU) 16, input/output ports 4, an electronic storage medium for executable programs and calibration values shown as a read-only memory (ROM) chip 14 in this particular example, random access memory (RAM) 18, keep alive memory (KAM) 20, and a data bus. The controller 8 communicates with, and therefore receives various signals from, sensors coupled to the engine 10, in addition to those signals previously discussed, including signals representing values of MAF from MAF sensor 50; engine coolant temperature (ECT) from a temperature sensor 58 coupled to a cooling sleeve 61; a profile ignition pickup signal (PIP) from a Hall effect sensor 59 (or other type of sensor) coupled to the crankshaft 40; throttle position (TP) from a throttle position sensor; MAP from MAP sensor 56; exhaust constituent concentration (EGO) from the exhaust gas sensor 26; and exhaust gas temperature from exhaust gas temperature sensor 27. An engine speed signal, RPM, may be generated by the controller 8 from signal PIP. Further sensors in communication with controller 8 are described below with reference to FIG. 1B. Based on signals received from the sensors, and further based on instructions stored in memory, controller 8 employs the various actuators of FIG. 1A to adjust engine operation.

The storage medium read-only memory 14 can be programmed with non-transitory, computer-readable data representing instructions executable by the processor 16 for performing the method of FIG. 2.

As noted above, FIG. 1A shows only one cylinder of a multi-cylinder engine. Each cylinder may similarly include its own set of intake/exhaust valves, fuel injector, spark plug, etc.

In the depicted example, vehicle 5 is a hybrid vehicle with multiple sources of torque available to one or more vehicle wheels 71. In other examples, however, vehicle 5 is a conventional vehicle with only an engine, or an electric vehicle with only one or more electric machines. In the example shown, vehicle 5 includes engine 10 and an electric machine 73. Electric machine 73 may be a motor or a motor/generator. Crankshaft 40 and electric machine 73 are connected via a transmission 75 to vehicle wheels 71 when one or more clutches are engaged. In the example shown, a first clutch 77a is provided between crankshaft 40 and electric machine 73, and a second clutch 77b is provided between electric machine 73 and transmission 75. Controller 8 may be configured to send a signal to an actuator of each clutch to engage or disengage the clutch, so as to connect or disconnect crankshaft 40 from electric machine 73 and the components connected thereto, and/or connect or disconnect electric machine 73 from transmission 75 and the components connected thereto. Transmission 75 may be a gearbox, a planetary gear system, or another type of transmission. The powertrain may be configured in various manners such that the vehicle is a parallel, series, or series-parallel hybrid vehicle.

Electric machine 73 receives electrical power from a traction battery 79 to provide torque to vehicle wheels 71. Optionally, electric machine 73 may also be operated as a generator to provide electrical power to charge battery 79, for example during a braking operation.

The vehicle 5 may comprise various degrees of hybrid capabilities based on various operating modes. In one example, the vehicle 5 may comprise an all-electric mode where the electric machine 73 is solely responsible for propelling the vehicle 5 while the engine 10 is deactivated. The vehicle 5 may further comprise a hybrid mode wherein the electric machine 73 and the engine 10 are used in tandem to propel the vehicle 5. The hybrid vehicle 5 may also operate in a combustion only mode wherein only the engine is used to propel the vehicle. The vehicle 5 may further comprise other hybrid capabilities, such as start/stop, that reduce emissions.

FIG. 1B illustrates a schematic view of an example exhaust system 102 for transporting exhaust gases produced by an internal combustion engine 110 of vehicle 5. Exhaust system 102 may be identical to the exhaust system 2 of FIG. 1A, and engine 110 may be identical to the engine 10 of FIG. 1A. In one non-limiting example, engine 110 is a diesel engine that produces a mechanical output by combusting a mixture of air and diesel fuel. Alternatively, engine 110 may be another type of engine such as a gasoline burning engine.

In the non-limiting example shown in FIG. 1B, exhaust system 102 includes an exhaust manifold 120 for receiving exhaust gases produced by one or more cylinders of engine 110, an oxidation catalyst 124, a mixing region 130, a selective catalytic reductant (SCR) catalyst 140, an emission control device 142, and a noise suppression device 150. Additionally, exhaust system 102 includes a plurality of exhaust pipes or passages for fluidly coupling the various exhaust system components of exhaust system 102. However, one or more of the oxidation catalyst 124, mixing region 130, SCR catalyst 140, emission control device 142, and noise suppression device 150 may be arranged in any order or combination in the exhaust system 102.

Exhaust system 102 may be arranged on the underside of the vehicle chassis. Additionally, exhaust system 102 may include one or more bends or curves to accommodate a particular vehicle arrangement. Further still, in some embodiments, exhaust system 102 may include additional components not illustrated in FIG. 1B and/or may omit components described herein.

The flow of gases and/or fluids in the exhaust system 102 occurs in a direction away from exhaust manifold 120, towards surrounding environment 195, through the exhaust system 102, and out of the exhaust system 102 through an exhaust passage 168 (alternatively referred to as fourth exhaust passage 168 below). Thus, in the example shown in FIG. 1B, the flow of gases and/or fluids in the exhaust system 102 may generally be from left to right as indicated by flow direction arrow 180. Therefore, in the description herein, the term "downstream" refers to the relative positioning of components in the exhaust system 102 with respect to the flow direction in exhaust system 102. As such, if a first component is described as downstream of a second component in the exhaust system 102, then gases and/or fluids flowing in the exhaust system 102 flow through the second component before flowing through first component.

Exhaust manifold 120 is fluidly coupled to a first catalyst 124 via a first exhaust passage 162 and a second exhaust passage 164. Herein, the first catalyst 124 is an oxidation catalyst 124, however, it will be appreciated that other catalysts may be used. Oxidation catalyst 124 is arranged downstream of exhaust manifold 120 in this example, with no components separating the oxidation catalyst 124 from the exhaust manifold 120 other than exhaust passages 162 and 164. First exhaust passage 162 and second exhaust passage 164 provide fluidic communication between exhaust manifold 120 and oxidation catalyst 124. In some examples, oxidation catalyst 124 is a diesel oxidation catalyst (DOC), e.g., an exhaust flow-through device which includes a substrate having a honeycomb structure and a large surface area coated with a catalyst layer. The catalyst layer may include precious metals including, but not limited to, platinum and palladium. As the exhaust gas flows over the catalyst layer, CO, gaseous HCs, and liquid HC particles may be oxidized to reduce emissions.

Mixing region 130 is arranged immediately downstream of oxidation catalyst 124 for receiving a liquid reductant, with no additional components separating mixing region 130 from oxidation catalyst 124. Mixing region 130 includes a first mixing region 132 and a second mixing region 134, the second mixing region 134 arranged downstream of the first mixing region 132. The first mixing region 132 includes an injector 136, for injecting a liquid into the mixing region 130. In some examples, the liquid injected by injector 136 is a liquid reductant such as ammonia or urea. The liquid reductant may be supplied to injector 136 from a storage tank in some examples. In this example, injector 136 is electronically actuated and in electrical and/or electronic communication with a controller 112, which may be identical to controller 8 of FIG. 1A. Similar to controller 8 of FIG. 1A, controller 112 may be configured as a PCM. Controller 112 receives signals from the various sensors of FIG. 1B and employs the various actuators of FIG. 1B to adjust engine operation based on the received signals and instructions stored in memory of the controller. For example, controller 112 is configured to send signals to an actuator of injector 136 for adjusting operation of the injector. In response to signals received from controller 112, the actuator of injector 136 may adjust the amount of liquid reductant being injected into the mixing region 130 and/or the timing of the injection.

A feedgas NOx sensor (alternatively referred to herein as a first $NO_x$ sensor) 190 and a feedgas temperature sensor (alternatively referred to herein as a first temperature sensor) 191 are arranged in the first mixing region 132. Accordingly, the first $NO_x$ sensor and first temperature sensor are arranged downstream of oxidation catalyst 124 in this example, with no other exhaust treatment devices interposed between the oxidation catalyst and sensors 190 and 191. The positioning of first $NO_x$ sensor 190 and first temperature sensor 191 in exhaust system 102 may be such that first $NO_x$ sensor 190 and first temperature sensor 191 are superposed. For example, feedgas $NO_x$ sensor 190 and feedgas temperature sensor 191 may be approximately aligned with one another and may coincide with one another in exhaust system 102. Said another way, first $NO_x$ sensor 190 and first temperature sensor 191 may be longitudinally aligned in first mixing region 132. In some examples, first $NO_x$ sensor 190 and first temperature sensor 191 are arranged perpendicular to the flow of gases and/or fluids in the exhaust system 102, and in such examples, may be positioned such that they are parallel to one another. In other examples, first temperature sensor 191 is positioned directly adjacent to first NOx sensor 190, such that first temperature sensor 191 and first $NO_x$ sensor 190 are in face-sharing contact with one another and in thermal communication. In this way, gases and/or fluids flowing through the exhaust system 102, and more specifically through first mixing region 132, may flow past first $NO_x$ sensor 190 and first temperature sensor 191 at approximately the same time. As such, first temperature sensor 191 may be positioned within first mixing region 132 for measuring a temperature of gases and/or fluids flowing past and/or being sampled at first $NO_x$ sensor 190. However, in other examples, first temperature sensor 191 may not be aligned with first $NO_x$ sensor 190, and instead spaced away from the $NO_x$ sensor 190 in the longitudinal direction.

The first temperature sensor 191 is electronically coupled to controller 112, and outputs of the first temperature sensor 191 corresponding to a temperature of gases and/or fluids flowing past first $NO_x$ sensor 190 are sent to controller 112. Similarly, first $NO_x$ sensor 190 is electronically coupled to controller 112, and outputs of first $NO_x$ sensor 190 corresponding to the level of $NO_x$ (e.g., concentration of $NO_x$ and/or 02) in gases and/or fluids flowing past first $NO_x$ sensor 190 are sent to controller 112.

While first NOx sensor 190 and first temperature sensor 191 are positioned downstream of injector 136 in FIG. 1B, they may alternatively be positioned substantially in line with injector 136. In still further examples, first $NO_x$ sensor 190 and first temperature sensor 191 may be positioned upstream of injector 136, or upstream of oxidation catalyst 124.

Second mixing region 134 is configured to accommodate a change in cross-sectional area or flow area between first mixing region 132 and SCR catalyst 140, which is arranged immediately downstream of second mixing region 134 in the depicted example. Specifically, the cross-sectional flow area created by the second mixing region 134 may increase in a downstream direction as shown. Therefore, first $NO_x$ sensor 190 and first temperature sensor 191 are positioned upstream of the SCR catalyst 140. In some examples, no additional components separate second mixing region 134 from SCR catalyst 140.

A mixing device 138 is arranged downstream of injector 136. Mixing device 138 is configured to receive engine exhaust gas and/or injected fluid reductant from injector 136 and direct the engine exhaust gas and/or fluid reductant downstream of mixing device 138 towards SCR catalyst 140. As shown in FIG. 1B, mixing device 138 may comprise a circular disc of fin sections. Each fin section may have a straight edge and a curved edge. In some examples, mixing device 138 is positioned in the first mixing region 132 downstream of injector 136, first temperature sensor 191, and first $NO_x$ sensor 190. In other examples, mixing device 138 is positioned in the second mixing region 134. Mixing device 138 is configured to increase the commingling and therefore uniformity of the exhaust gas and fluid reductant mixture in second mixing region 134 before the mixture reaches SCR catalyst 140.

SCR catalyst 140 is configured to convert $NO_x$ into water and nitrogen as inert byproducts of combustion using the fluid reductant, e.g., ammonia ($NH_3$) or urea injected by the injector 136, and an active catalyst. The SCR catalyst, which may alternatively be referred to as a $DeNO_x$ catalyst, may be constructed of titanium dioxide containing the oxides of transition metals such as, for example, vanadium, molybdenum, and tungsten to act as catalytically active components. SCR catalyst 140 may be configured as a ceramic brick or a ceramic honeycomb structure, a plate structure, or any other suitable design. SCR catalyst 140 can include any suitable catalyst for reducing $NO_x$ or other products of combustion resulting from the combustion of fuel by engine 110.

Emission control device 142 is positioned downstream of SCR catalyst 140. In some examples, emission control device 142 is a diesel particulate filter (DPF). The DPF may operate actively or passively, and the filtering medium can be of various types of material and geometric construction. One example construction includes a wall-flow ceramic monolith comprising alternating channels that are plugged at opposite ends, thus forcing the exhaust flow through the common wall of the adjacent channels whereupon the particulate matter is deposited.

Alternatively, emission control device 142 and SCR catalyst 140 may be combined on one substrate (e.g., a wall-flow ceramic DPF element coated with NOx storage agents and platinum group metals).

After passing through emission control device 142, exhaust gases and/or fluids flow through an after-treatment region 144. After-treatment region 144 is configured to accommodate a change in cross-sectional area or flow area between emission control device 142 and a third exhaust passage 166 arranged immediately downstream of emission control device 142. Specifically, the cross-sectional flow area created by the after-treatment region 144 decreases in a downstream direction. After-treatment region 144 fluidly couples emission control device 142 to third exhaust passage 166. However, in other examples, exhaust system 102 does not include an after-treatment region, and emission control device 142 is directly and/or physically coupled to third exhaust passage 166, with no additional components separating emission control device 142 from third exhaust passage 166.

A tailpipe temperature sensor (alternatively referred to herein as a second temperature sensor) 193 and a tailpipe $NO_x$ sensor (alternatively referred to herein as a second $NO_x$ sensor) 192 are positioned in third exhaust passage 166. However, in other examples, second temperature sensor 193 and second $NO_x$ sensor 192 may be positioned in after-treatment region 144. In all examples, however, second temperature sensor 193 and second $NO_x$ sensor 192 are positioned downstream of SCR catalyst 140 and emission control device 142. The positioning of second temperature sensor 193 and second $NO_x$ sensor 192 relative to one another and relative to after-treatment region 144 may be similar to the positioning of first temperature sensor 191 and first $NO_x$ sensor 190 relative to one another and relative to first mixing region 132 which is described above.

Second temperature sensor 193 is electronically coupled to controller 112, and outputs of second temperature sensor 193 corresponding to a temperature of gases and/or fluids flowing past second $NO_x$ sensor 192 are sent to controller 112. Similarly, second $NO_x$ sensor 192 is electronically coupled to controller 112, and outputs of second $NO_x$ sensor 192 corresponding to the level of $NO_x$ in gases and/or fluids flowing past second $NO_x$ sensor 192 are sent to controller 112.

First $NO_x$ sensor 190 and second $NO_x$ sensor 192 may be constructed similarly and function similarly. In one non-limiting example, each of the $NO_x$ sensors comprises a sensing element arranged within a protection tube, a heater arranged within the protection tube, the heater in thermal communication with the sensing element and optionally in direct physical contact with the sensing element, and gas exchange holes configured to intake gas to be tested and exhaust gas after it is tested. The sensing element may include a plurality of layers of one or more ceramic materials arranged in a stacked configuration. The layers may include one or more layers of a solid electrolyte capable of conducting ionic oxygen. Examples of suitable solid electrolytes include, but are not limited to, zirconium oxide-based materials. In each $NO_x$ sensor, (e.g., the first $NO_x$ sensor 190 and the second $NO_x$ sensor 192), a heater is disposed between the various layers (or otherwise in thermal communication with the layers) to increase the ionic conductivity of the layers. The heater is configured to receive power from a battery (e.g., battery 184 of FIG. 1B) or another power source, including during key-off and/or vehicle off conditions, in order to heat the NOx sensor to light-up temperature and optionally beyond light-off temperature, as discussed below. The vehicle-off may be responsive to a user turning off the vehicle via a fob, and/or another vehicle-off command such as a remote vehicle-off. For example, as described further below, an alarm clock may "wake up" the controller after a delay after a vehicle-off event, and the controller may then send a signal to battery 184 to supply power to the heater of one or both of the NOx sensors to heat up the sensor(s). In both examples, a first heater 196 is illustrated via a dashed line box surrounding the first $NO_x$ sensor 190 and a second heater 197 is illustrated via a dashed line box surrounding the second $NO_x$ sensor 192. As will be described below, the heaters may be operated in tandem and/or individually based on one or more sensed conditions indicating a request to heat the sensors.

Both $NO_x$ sensors may be configured to measure and/or estimate a concentration of $NO_x$ and/or 02 in an exhaust gas mixture flowing through exhaust system 102, and transmit this information to the controller. During engine operation, the first $NO_x$ sensor 190 measures $NO_x$ levels emitted by the engine, while the second $NO_x$ sensor measures $NO_x$ levels remaining in the exhaust system 102 after treatment by the SCR catalyst 140. By comparing the outputs of the two $NO_x$ sensors 190 and 192, the overall $NO_x$ removal efficiency of the exhaust system 102 may be estimated.

However, $NO_x$ sensors 190 and 192 may become degraded (e.g., gain-skewed, cracked, contaminated, etc.), and as a result the accuracy of their outputs used to estimate and/or measure $NO_x$ levels in the exhaust system 102 may become reduced. Further, the $NO_x$ sensors may develop an offset that influences exhaust emissions. In order to detect and diagnose $NO_x$ sensor degradation, an SD test may be performed after a vehicle\-off event, as described in greater detail below with reference to FIG. 2. In contrast, in order to detect and diagnose NOx sensor offset, an offset test may be performed, after the SD test, while vehicle-off conditions are still present.

Further, an ambient temperature sensor 114 is electronically coupled to controller 112, and outputs of ambient temperature sensor 114 corresponding to an ambient temperature (e.g., a temperature of the atmosphere outside of the vehicle) are sent to controller 112. Ambient temperature sensor 114 may be arranged at a location in the vehicle which is in thermal communication with the atmosphere outside of the vehicle (e.g., at an inlet of an engine intake pipe).

The depicted exhaust system further includes an exhaust gas sensor 126 and an exhaust gas temperature sensor 127, which may be identical to exhaust gas sensor 26 and exhaust gas temperature sensor 27 of FIG. 1A, respectively. While sensors 126 and 127 are shown arranged in second exhaust passage 164 for the sake of example, they may alternatively be arranged at any portion of the exhaust system upstream of exhaust treatment system 80 (e.g., in first exhaust passage 162). Sensors 126 and 127 are each electronically coupled to controller 112, and their outputs are sent to controller 112.

Noise suppression device 150 is arranged downstream of catalyst 140 and emission control device 142. Noise suppression device 150 is configured to attenuate the intensity of sound waves traveling away from exhaust manifold 120, towards surrounding environment 195. Third exhaust passage 166 provides fluidic communication between after-treatment region 144 and noise suppression device 150. Thus, exhaust gases flow from the after-treatment region 144, through third exhaust passage 166, to noise suppression device 150. After passing through noise suppression device 150, exhaust gases flow through fourth exhaust passage 168, en route to the surrounding environment 195.

A vehicle-off event may be detected by the controller 112 based on signals received from an input device 170 of vehicle 5, which is depicted schematically in FIG. 1B. The input device 170 may include a button, switch, knob, key-ignition, touch screen display, FOB, etc., where the position and/or digital state of the input device 170 is adjustable to turn the engine 110 on or off. In the context of a hybrid vehicle, input device 170 may further be adjustable to turn an electric motor which provides vehicle drive power on or off. Input device 170 may therefore, in some examples, be a vehicle ignition with an engine-on, engine-off functionality. Alternatively, in the context of a keyless vehicle, the start/stop and/or on/off functionality of the vehicle may be controlled by a button, switch, knob, touch screen, etc. Thus, vehicle operator 172 may adjust the input device 170 to a first position and/or digital state to initiate a vehicle-on event to turn on the engine 110 and/or an electric motor providing drive force, whereas the vehicle operator 172 may adjust the position of the input device to a second position and/or digital state to initiate a vehicle-off event to turn off the engine 110 and/or stop an electric motor from providing vehicle drive force. Said another way, a vehicle-off event may refer to conditions where the engine 110 is shutdown to rest and the vehicle is off (e.g., during a vehicle-off event, or an engine stop event in a keyless system with a stop/start button), and where the electric motor is disabled from providing drive force to the vehicle in the context of a hybrid vehicle. Thus, the vehicle-off event may include terminating a combustion cycle in the engine 110 based on input from the vehicle operator 172 via input device 170. Input device 170 is electronically coupled with controller 112, and configured to send a signal indicating the position and/or digital state of input device 170 to controller 112 (e.g., on an interrupt basis when the position/state changes, continually, or periodically).

In accordance with the method disclosed herein, power may be provided to the $NO_x$ sensors after a duration has elapsed following a vehicle-off event, to allow for performance of SD tests followed by offset tests. In the depicted example, power is provided to $NO_x$ sensors 190 and 192 by a battery 184 during vehicle-off, including to the heater of each $NO_x$ sensor to heat the NOx sensor. In examples where the vehicle is a hybrid vehicle, battery 184 may optionally correspond to battery 79 of FIG. 1A. Battery 184 electronically communicates with controller 112 for receiving digital signals therefrom. Further, during a vehicle-off event, power may be provided to controller 112 via battery 184.

As described in greater detail below with reference to FIG. 2, controller 112 may comprise computer-readable instructions stored in non-transitory memory for the $NO_x$ heaters following a vehicle-off event in response to conditions. As described above, the vehicle-off event is a vehicle off event signaled via an end of a drive cycle. As such, the vehicle-off may be differentiated from a start/stop in that the drive cycle is complete as indicated via actuation of a key, depression of a button, use of a FOB, or the like. In one example, the vehicle is restarted following the vehicle-off event in a manner similar to the initiation of the vehicle-off event.

Turning now to FIG. 2, it shows a method 200 for determining if conditions for heating the $NO_x$ sensor are met. Instructions for carrying out method 200 may be executed by a controller based on instructions stored on a memory of the controller and in conjunction with signals received from sensors of the engine system, such as the sensors described above with reference to FIG. 1A. The controller may employ engine actuators of the engine system to adjust engine operation, according to the method described below.

The method 200 begins at 202, which includes determining current operating parameters. Current operating parameters may include but are not limited to one or more of a throttle position, a manifold vacuum, an engine speed, an engine temperature, an EGR flow rate, and an air/fuel ratio.

The method 200 proceeds to 204, which includes determining is a vehicle-off event is requested. As described above, the vehicle-off event may be detected by the controller based on signals received from an input device, such as input device 170 of FIG. 1B.

If a vehicle-off event is not detected, then the method 200 proceeds to 206, which includes maintaining current operating parameters. As such, the $NO_x$ sensors are not heated.

If a vehicle-off event is detected, then the method 200 proceeds to 208, which includes determining if SD or offset testing is desired. For example, it may be desired to perform SD and/or offset tests at regular intervals, for example, after a threshold number of drive cycles, a threshold amount of time, a threshold number of engine cycles, etc. In yet further examples, SD and/or offset tests may be desired if certain engine or environmental conditions are satisfied. For example, the interval between SD tests and/or the interval between offset tests may be adjusted based on engine operating conditions and/or environmental conditions. If SD and offset testing is not desired, then the method 200 proceeds to 206 as described above.

In some examples of the method 200, the step 208 may be omitted such that the method 200 may proceed from 204 to 210. In this way, conditions where the SD and/or offset tests are not desired may still result in the $NO_x$ sensor heater being activated.

If SD and/or offset testing is desired, then the method 200 proceeds to 210, which includes calculating an energy applied to a $NO_x$ sensor during an entire drive cycle. In one example, the energy applied may be calculated based on one or more of an exhaust gas temperature, an exhaust gas flow rate, and the like. In one example, the energy applied increases as the exhaust gas temperature increases or as the exhaust gas flow rate decreases. Further in one example, additionally or alternatively, the energy applied increases as backpressure in the exhaust system is increased such that exhaust gas contacts the $NO_x$ sensor for a greater duration of time.

The method 200 proceeds to 212, which includes determining a highest $NO_x$ sensor temperature during the drive cycle prior to the vehicle-off. The highest $NO_x$ sensor may be determined via data in a multi-input look-up table wherein inputs thereof includes a starting ambient temperature and an exhaust temperature.

The method 200 proceeds to 214, which includes determining if one or more conditions of the drive cycle are met. The conditions include if an energy applied is less than a threshold energy at 216, if a $NO_x$ sensor did not light off during the drive cycle at 218, if an offset of a $NO_x$ sensor is greater than a threshold offset during an engine overrun at 220, and if an exhaust gas temperature was less than a threshold exhaust gas temperature during an entirety of the drive cycle.

In one example, the energy applied to the $NO_x$ sensor may also correspond to a change in enthalpy of the $NO_x$ sensor. The threshold energy, and therefore threshold enthalpy, may be a positive value equaling a gain in energy. The threshold energy and/or threshold enthalpy includes where the gain in energy is sufficient to drive off ammonia accumulated onto the $NO_x$ sensor without requesting assistance from the heater.

The $NO_x$ sensor light off may be based on a $NO_x$ sensor temperature where absorbed and desorbed $NO_x$ are in balance. In one example, the $NO_x$ sensor light off temperature is a fixed temperature, wherein the light off temperature is higher than a temperature at which ammonia is burned off the $NO_x$ sensor.

At 220, the engine overrun may occur following a last engine combustion of the drive cycle, which may include sensing an offset of the $NO_x$ sensor. The threshold offset may be based on a previously determined offset during an offset test, a fixed value determined during manufacturing, or based on an average offset determined based on a plurality of offset test results. In one example, the offset being greater than the threshold offset may take priority over the sensor being lit off. That is to say, even if the sensor was lit-off during the previous drive cycle, if the offset is greater than the threshold offset, then conditions for heating the sensor may be met. In one example, the offset exceeding the threshold offset may take priority over all the other conditions determined at 214.

At 222, a highest exhaust gas temperature during the drive cycle is compared to a threshold exhaust gas temperature. The threshold exhaust gas temperature may be based on an exhaust gas temperature as which the $NO_x$ sensor is hot enough to remove accumulated ammonia thereon. In some examples, additionally or alternatively, the method 200 may further include determining a duration at which the exhaust gas temperature was greater than or equal to the threshold temperature.

The method 200 proceeds to 224, which includes determining if one or more of the drive cycle conditions determined at 214 is met. If none of the conditions is met, then the method 200 proceeds to 226, which includes not activating a $NO_x$ sensor heater. As such, an offset of the sensor may be less than the threshold offset without assistance from the heater.

If at least one of the conditions is met, then the method 200 proceeds to 228, which includes activating the heater for the $NO_x$ sensor. Activating the heater may include sending power from the battery to the heater. As such, a charge of the battery may be reduced when the heater is activated. The heater may heat the $NO_x$ sensor to a temperature configured to remove ammonia captured onto the $NO_x$ sensor. The heater may be activated for a fixed amount of time, in one example. Additionally or alternatively, the heater may be activated for an adjustable amount of time based on the conditions sensed at 214. For example, as the difference between the energy applied and the threshold energy increases, then the amount of time the heater is activated increases. As another example, as the difference between the offset and the threshold offset increases, then the amount of time the heater is activated increases. As a further example, as the difference between the highest exhaust gas temperature and the threshold exhaust gas temperature increases, then the amount of time the heater is activated also increases.

The method 200 proceeds to 230, which includes performing the SD and/or the offset test. In some examples, the method 200 may comprise determining conditions of the drive cycle for each $NO_x$ sensor of an exhaust system. The method 200 may further includes determining a highest temperature of each $NO_x$ sensor of the exhaust system. Thus, an example of the method 200 being executed in the system of FIG. 1B may include determining an energy applied to and a highest temperature of the first $NO_x$ sensor and the second $NO_x$ sensor. The method may further determine an offset measured for each of the sensors during the engine overrun. If conditions are met for heating a first sensor, but not a second sensor, then the heater of only the first sensor may be activated. As such, a battery charge may be conserved.

Turning now to FIG. 3, it shows a graph 300 illustrating an engine operating sequence according to the method 200 being executed at a vehicle off event. Plot 310 illustrates a vehicle-status. Plot 320 illustrates an engine status. Plot 330 illustrates an exhaust temperature and dashed line 332 illustrates the threshold exhaust gas temperature. Plot 340 illustrates a $NO_x$ sensor temperature and dashed line 342 illustrates a $NO_x$ sensor light-off temperature. Plot 350 illustrates a $NO_x$ sensor heater activity. Plot 360 illustrates a $NO_x$ sensor offset sensed during an engine overrun. Plot 370 illustrates a cumulative heat energy applied to the $NO_x$ sensor during the engine cycle and dashed line 372 illustrates the threshold energy. The plots are graphed against time, where time increases from a left to a right side of the figure.

Prior to t1, a vehicle-status is on (plot 310) and the engine is on (plot 320). The exhaust gas temperature is increasing toward the threshold exhaust gas temperature (plot 330 and dashed line 332, respectively). The $NO_x$ sensor temperature is increasing with the exhaust gas temperature toward the $NO_x$ sensor light-off temperature (plot 340 and dashed line 342, respectively). The $NO_x$ sensor heater is not on (plot 350). A $NO_x$ sensor offset is not currently determined and is equal to zero (plot 360). A heat energy applied to the $NO_x$ sensor is increasing toward the threshold heat energy. As described above, the heat energy may correspond to a change in enthalpy of the $NO_x$ sensor over the drive cycle. In this way, the heat energy may increase and decrease during the drive cycle based on various conditions, including an exhaust gas temperature, exhaust flow rate, a backpressure, hybrid mode, and the like.

At t1, the engine is switched off but the vehicle status is still on. As such, the vehicle enters an all-electric mode of operation. The heat energy applied to the $NO_x$ sensor is equal to the threshold heat energy at 372. Between t1 and t2, the exhaust temperature decreases to a relatively low temperature due to exhaust gas not being produced. The $NO_x$ sensor temperature decreases with the exhaust temperature. As illustrated, the $NO_x$ sensor temperature decreases to a relatively low temperature without reaching the light-off temperature. The heat energy applied to the $NO_x$ sensor decreases. The $NO_x$ sensor offset is monitored during the engine run-off between t1 and t2. The $NO_x$ sensor offset is a relatively low offset, less than the threshold offset.

At t2, the vehicle status switches to off. As such, a request to shut-down the vehicle is present. Between t2 and t3, the $NO_x$ sensor heater is not activated since the heat energy applied to the $NO_x$ sensor exceeded the threshold heat energy at one point during the drive cycle. As such, an amount of ammonia accumulated on the $NO_x$ sensor may already be relatively low without activating the $NO_x$ heater. This is further confirmed via the relatively low offset sensed during the engine overrun.

From t3 to t4, a plurality of drive cycles occur. Between t4 and t6, the vehicle status and the engine status are on. The exhaust temperature increases toward the threshold exhaust temperature. The $NO_x$ sensor temperature increases toward the light-off temperature. The heat energy applied to the $NO_x$ sensor increases toward the threshold heat energy. At t6, the vehicle status and the engine are switched to off. The exhaust temperature and $NO_x$ sensor temperature begin to decrease. The heat energy applied to the $NO_x$ sensor begins to decrease without ever reaching the threshold heat energy during the drive cycle.

Between t6 and t7, the $NO_x$ sensor offset is tested during the engine overrun. The $NO_x$ sensor offset increases to an offset less than the threshold offset. At t7, the $NO_x$ sensor heater is activated in response to the heat energy applied to the $NO_x$ sensor being less than the threshold heat energy during all of the drive cycle. Between t7 and t8, the $NO_x$ sensor heater is active and the $NO_x$ sensor temperature increases to a temperature greater than the light-off temperature. As such, ammonia particles on the sensor may be removed. At t8 and after, the $NO_x$ sensor heater is maintained active until a threshold duration has passed. Additionally or alternatively, the duration in which the $NO_x$ sensor heater is active may be based on a difference between the $NO_x$ sensor offset and the threshold offset.

In this way, a $NO_x$ sensor offset may be reduced by activating a $NO_x$ sensor heater in response to conditions during a drive cycle. The conditions include one or more of a heat energy applied to the $NO_x$ sensor, a highest sensor temperature, an offset of the sensor sensed during an engine overrun, and a highest exhaust gas temperature. The technical effect of basing activation of the $NO_x$ sensor heater on the conditions is to increase an accuracy of when the $NO_x$ sensor heater is activated. By doing this, battery charge may be conserved and an accuracy of the $NO_x$ sensor may be increased.

An embodiment of a method comprises heating a $NO_x$ sensor at a vehicle off in response to a cumulative heat energy applied to the $NO_x$ sensor over a drive cycle being less than a threshold. A first example of the method further includes where the threshold is based on an amount of cumulative heat energy configured to decrease an amount of ammonia on the $NO_x$ sensor. A second example of the method, optionally including the first example, further includes where heating the $NO_x$ sensor is further in response to one or more conditions including the $NO_x$ sensor reaching a light-off temperature during the drive cycle, an exhaust gas temperature reaching a threshold exhaust gas temperature during the drive cycle, and an offset sensed during an engine overrun exceeding a threshold offset. A third example of the method, optionally including one or more of the previous examples, further includes where heating the $NO_x$ sensor in response to the offset exceeding the threshold offset is prioritized and occurs independent of other conditions. A fourth example of the method, optionally including one or more of the previous examples, further includes where the cumulative heat energy increases and decreases over the drive cycle as an enthalpy of an exhaust system changes. A fifth example of the method, optionally including one or more of the previous examples, further includes determining if heating the $NO_x$ sensor is desired in response to a self-diagnosis or an offset test being desired. A sixth example of the method, optionally including one or more of the previous examples, further includes not heating the $NO_x$ sensor in response to the cumulative heat energy applied to the $NO_x$ sensor over the drive cycle being greater than or equal to the threshold.

An embodiment of a system comprises an engine, an exhaust system fluidly coupled to the engine, the exhaust system comprising a $NO_x$ sensor with a heater integrally arranged therein, and a controller comprising computer-readable instructions stored on non-transitory memory thereof that when executed enables the controller to activate the heater at a vehicle off in response to a cumulative heat energy applied to the $NO_x$ sensor over a drive cycle being less than a threshold heat energy. A first example of the system further includes where the instructions further enable the controller to activate the heater at the vehicle off in response to an exhaust gas temperature being less than a threshold exhaust gas temperature during the drive cycle. A second example of the system, optionally including the first example, further includes where the instructions further enable the controller to activate the heater at the vehicle off in response to an offset of the $NO_x$ sensor sensed during an engine overrun being greater than a threshold offset. A third example of the system, optionally including one or more of the previous examples, further includes where the instructions further enable the controller to activate the heater at the vehicle off in response to a temperature of the $NO_x$ sensor being less than a light-off temperature during all of the drive cycle. A fourth example of the system, optionally including one or more of the previous examples, further includes where the instructions further enable the controller to maintain the heater off at the vehicle off in response to the cumulative heat energy applied being greater than or equal to the threshold heat energy, wherein the threshold heat energy is based on an amount of heat energy configured to remove ammonia accumulated on the $NO_x$ sensor. A fifth example of the system, optionally including one or more of the previous examples, further includes where the $NO_x$ sensor is a first $NO_x$ sensor and the heater is a first heater, further comprising a second $NO_x$ sensor and a second heater, wherein a selective catalytic reduction device is arranged between the first $NO_x$ sensor and the second $NO_x$ sensor. A sixth example of the system, optionally including one or more of the previous examples, further includes where the instructions further enable the controller to activate the second heater in response to the cumulative heat energy applied to the second $NO_x$ sensor over the drive cycle being less than the threshold heat energy. A seventh example of the system, optionally including one or more of the previous examples, further includes where the second heater is operated independently of the first heater, and wherein the engine is arranged in a hybrid vehicle comprising an electric motor and a battery.

An embodiment of a system for a hybrid vehicle comprising an engine and an electric motor configured to drive the hybrid vehicle in tandem or individually, a first $NO_x$ sensor and a second $NO_x$ sensor arranged in an exhaust passage, wherein a selective catalytic reduction device is arranged between the first $NO_x$ sensor and the second $NO_x$ sensor, a first heater arranged in the first $NO_x$ sensor and a second heater arranged in the second $NO_x$ sensor, and a controller comprising computer-readable instructions stored on non-transitory memory thereof that when executed enable the controller to activate one or more of the first heater and the second heater at a vehicle off in response to one or more of a plurality of conditions including a cumulative heat energy applied to one or more of the first $NO_x$ sensor and the second $NO_x$ sensor being less than a threshold heat energy during all of a drive cycle, an exhaust gas temperature being less than a threshold exhaust gas temperature during all of the drive cycle, a temperature of one or more of the first $NO_x$ sensor and the second $NO_x$ sensor being less than a light off temperature during all of the drive cycle, and an offset of one or more of the first $NO_x$ sensor and the second $NO_x$ sensor being greater than a threshold offset during an engine overrun. A first example of the system further includes where the offset being greater than the threshold offset is prioritized over other conditions of the plurality of conditions. A second example of the system, optionally including the first example, further includes where the instructions enable the controller to activate only the first heater in response to one or more of the conditions being met for only the first $NO_x$ sensor and not the second $NO_x$ sensor, and wherein the instructions further enable the controller to activate only the second heater in response to one or more of the conditions being met for only the second $NO_x$ sensor. A third example of the system, optionally including one or more of the previous examples, further includes where the instructions enable the controller to not activate the first heater and the second heater in response to none of the plurality of conditions being met. A fourth example of the system, optionally including one or more of the previous examples, further includes where the instructions enable the controller to operate the hybrid vehicle in a combustion only mode, an all-electric mode, and a hybrid mode, wherein only the engine propels the vehicle in the combustion only mode, only the electric motor propels the vehicle in the all-electric mode, and a combination of the engine and the electric motor propel the vehicle in the hybrid mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
heating a $NO_x$ sensor at a vehicle off in response to a cumulative heat energy applied to the $NO_x$ sensor over a drive cycle being less than a threshold, the threshold based on an amount of cumulative heat energy configured to decrease an amount of ammonia on the $NO_x$ sensor.

2. The method of claim 1, wherein heating the $NO_x$ sensor is further in response to one or more conditions including the $NO_x$ sensor reaching a light-off temperature during the drive cycle, an exhaust gas temperature reaching a threshold exhaust gas temperature during the drive cycle, and an offset sensed during an engine overrun exceeding a threshold offset.

3. The method of claim 2, wherein heating the $NO_x$ sensor in response to the offset exceeding the threshold offset is prioritized and occurs independent of other conditions.

4. The method of claim 1, wherein the cumulative heat energy increases and decreases over the drive cycle as an enthalpy of an exhaust system changes.

5. The method of claim 1, further comprising determining if heating the $NO_x$ sensor is desired in response to a self-diagnosis or an offset test being desired.

6. The method of claim 1, further comprising not heating the $NO_x$ sensor in response to the cumulative heat energy applied to the $NO_x$ sensor over the drive cycle being greater than or equal to the threshold.

7. A system, comprising:
an engine;
an exhaust system fluidly coupled to the engine, the exhaust system comprising a $NO_x$ sensor with a heater integrally arranged therein; and
a controller comprising computer-readable instructions stored on non-transitory memory thereof that when executed enables the controller to:
activate the heater at a vehicle off condition in response to a cumulative heat energy applied to the $NO_x$ sensor over a drive cycle being less than a threshold heat energy.

8. The system of claim 7, wherein the instructions further enable the controller to activate the heater at the vehicle off condition in response to an exhaust gas temperature being less than a threshold exhaust gas temperature during the drive cycle.

9. The system of claim 7, wherein the instructions further enable the controller to activate the heater at the vehicle off condition in response to an offset of the $NO_x$ sensor sensed during an engine overrun being greater than a threshold offset.

10. The system of claim 7, wherein the instructions further enable the controller to activate the heater at the vehicle off condition in response to a temperature of the $NO_x$ sensor being less than a light-off temperature during all of the drive cycle.

11. The system of claim 7, wherein the instructions further enable the controller to maintain the heater off at the vehicle off condition in response to the cumulative heat energy applied being greater than or equal to the threshold heat energy, wherein the threshold heat energy is based on an amount of heat energy configured to remove ammonia accumulated on the $NO_x$ sensor.

12. The system of claim 7, wherein the $NO_x$ sensor is a first $NO_x$ sensor and the heater is a first heater, further comprising a second $NO_x$ sensor and a second heater, wherein a selective catalytic reduction device is arranged between the first $NO_x$ sensor and the second $NO_x$ sensor.

13. The system of claim 12, wherein the instructions further enable the controller to activate the second heater in response to the cumulative heat energy applied to the second $NO_x$ sensor over the drive cycle being less than the threshold heat energy.

14. The system of claim 12, wherein the second heater is operated independently of the first heater, and wherein the engine is arranged in a hybrid vehicle comprising an electric motor and a battery.

15. A system for a hybrid vehicle, comprising:
an engine and an electric motor configured to drive the hybrid vehicle in tandem or individually;
a first $NO_x$ sensor and a second $NO_x$ sensor arranged in an exhaust passage, wherein a selective catalytic reduction device is arranged between the first $NO_x$ sensor and the second $NO_x$ sensor;
a first heater arranged in the first $NO_x$ sensor and a second heater arranged in the second $NO_x$ sensor; and
a controller comprising computer-readable instructions stored on non-transitory memory thereof that when executed enable the controller to:
activate one or more of the first heater and the second heater at a vehicle off in response to one or more of a plurality of conditions including a cumulative heat energy applied to one or more of the first $NO_x$ sensor and the second $NO_x$ sensor being less than a threshold heat energy during all of a drive cycle, an exhaust gas temperature being less than a threshold exhaust gas temperature during all of the drive cycle, a temperature of one or more of the first $NO_x$ sensor and the second $NO_x$ sensor being less than a light off temperature during all of the drive cycle, and an offset of one or more of the first $NO_x$ sensor and the second $NO_x$ sensor being greater than a threshold offset during an engine overrun.

16. The system of claim 15, wherein the offset being greater than the threshold offset is prioritized over other conditions of the plurality of conditions.

17. The system of claim 15, wherein the instructions enable the controller to activate only the first heater in response to one or more of the conditions being met for only the first $NO_x$ sensor and not the second $NO_x$ sensor, and wherein the instructions further enable the controller to activate only the second heater in response to one or more of the conditions being met for only the second $NO_x$ sensor.

18. The system of claim 15, wherein the instructions enable the controller to not activate the first heater and the second heater in response to none of the plurality of conditions being met.

19. The system of claim 15, wherein the instructions enable the controller to operate the hybrid vehicle in a combustion only mode, an all-electric mode, and a hybrid mode, wherein only the engine propels the vehicle in the combustion only mode, only the electric motor propels the vehicle in the all-electric mode, and a combination of the engine and the electric motor propel the vehicle in the hybrid mode.

* * * * *